United States Patent
Somavarapu et al.

(10) Patent No.: US 8,112,665 B1
(45) Date of Patent: Feb. 7, 2012

(54) METHODS AND SYSTEMS FOR RAPID ROLLBACK AND RAPID RETRY OF A DATA MIGRATION

(75) Inventors: Nagender Somavarapu, Bangalore (IN); Anurag Palsule, Bangalore (IN); Mudhiganti Devender Reddy, Bangalore (IN); Mohammed Nazeem, Andhra Pradesh (IN)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 12/842,424

(22) Filed: Jul. 23, 2010

(51) Int. Cl.
*G06F 11/00* (2006.01)
(52) U.S. Cl. .......................... 714/15; 714/4.1
(58) Field of Classification Search ............ 714/4.1, 714/15
See application file for complete search history.

(56) References Cited

U.S. PATENT DOCUMENTS

| | | | |
|---|---|---|---|
| 7,379,996 B2* | 5/2008 | Papatla et al. | 709/224 |
| 7,383,463 B2* | 6/2008 | Hayden et al. | 714/4.11 |
| 7,613,889 B2* | 11/2009 | Stakutis et al. | 711/162 |
| 7,661,015 B2* | 2/2010 | Revanuru et al. | 714/4.1 |
| 7,765,272 B1* | 7/2010 | McKernan et al. | 709/217 |
| 7,769,722 B1* | 8/2010 | Bergant et al. | 707/681 |
| 2005/0038828 A1* | 2/2005 | Kaluskar et al. | 707/200 |
| 2007/0094467 A1* | 4/2007 | Yamasaki | 711/162 |
| 2009/0006493 A1* | 1/2009 | Draper et al. | 707/202 |
| 2009/0222691 A1* | 9/2009 | Riemers | 714/18 |

* cited by examiner

*Primary Examiner* — Charles Ehne
(74) *Attorney, Agent, or Firm* — Perkins Coie LLP

(57) ABSTRACT

Methods and systems for rapidly rolling back and retrying a data migration between a first and a second storage system. In one embodiment, upon receiving a request at a provisioning manager to perform a rollback of a first data migration, the first storage system merges, to a baseline dataset, a first incremental dataset received by the second storage system after the first data migration. In another embodiment, upon receiving a request at a provisioning manager to perform a retry of the data migration, the second storage system merges, to the data received by the second storage system during and immediately after the first data migration, a second incremental dataset received to the first storage system after performance of the rollback. Throughout the migration rollback and retry, the data of the baseline dataset, first incremental dataset, and second incremental data set is made available to the client.

30 Claims, 7 Drawing Sheets

METHODS AND SYSTEMS FOR RAPID ROLLBACK AND RAPID RETRY OF A DATA MIGRATION

FIELD OF THE INVENTION

At least one embodiment of the present invention pertains to data migration, and more particularly, to methods and systems for rapidly rolling back and retrying a migration of data between storage systems.

BACKGROUND

In recent years, an exponential increase in the demand for computer storage has been driven by growth in digital information due to faster processors, lower cost of digital data storage, increasing availability of high data rate access, and development of new applications. This increased dependence on computer data has caused a need for more efficient data storage and data migration technology.

Online data migration is the process of transferring data between storage systems in a networked environment. Data migration is usually performed programmatically to achieve an automated migration, freeing up human resources from tedious and often time-consuming tasks. Data migration may be required when, for example, organizations or individuals change computer systems or when it is determined, by capacity planning, that additional data resources are required for an existing computer system.

Non-disruptive data motion is the process of performing an online data migration that is virtually transparent to a client accessing the data. The client is unaware of the migration process and can access the data throughout the migration process.

A computer network is typically utilized as a transport mechanism for data migration between storage systems. However, due to the large amounts of data copied across the network (often well over several terabytes in an enterprise environment) the duration of the migration process can exceed tolerable levels, in some cases lasting for days or weeks.

Often, after a data migration from a source storage system to a destination storage system, an unforeseen problem emerges, necessitating a reversion ("rollback") of the migration), to the source storage system. For example, one such problem could be that, after the destination storage system is in operation for several hours or days after the migration from the source storage system, an administrator determines that the destination storage system lacks sufficient capacity to store data at a current or future data growth rate. Another problem may relate to unexpectedly slow performance, at the destination storage system, of a migrated application or dataset. In these cases, it is desirable to revert back to utilizing the source storage system, at least until the unforeseen problem is addressed. However, it is not possible to simply redirect the client from accessing the destination storage system to accessing the source storage system, because the data at the destination storage system is modified arbitrarily after the initial data migration based on new data received to the destination storage system. For example, during the initial data migration of a baseline data set from the source storage system to the destination storage system, a user file may be copied. The user file may include of, for example, a document, email, spreadsheet, or another form of electronic information. Once the baseline dataset having the user file is copied to the destination storage system, the user may access the file and modify the file's content. For example, the user may append a graph to the document, reply to the email, or add a new calculation to the spreadsheet. These new modifications are made at the destination storage system, not the source storage system. Therefore, a complete rollback from the destination storage system to the source storage system in the conventional system involves copying both the previously migrated baseline dataset and the user modifications made to the baseline dataset.

Similarly, after a successful rollback migration to the source storage system and after the unforeseen problem of the initial migration has been resolved, a retry of the migration to the second storage system may be desirable. However, as in the rollback migration, the retry migration in the conventional system involves copying a complete dataset of the source storage system to the destination storage system. Following the previous example, after the rollback migration, the user may perform additional modification to one or more user files located at the source storage system. The user may, for example, further modify the graph previously added to the document, receive a response to the email reply, or alter a value used by the spreadsheet calculation. These modifications must be copied during the retry migration to maintain data integrity.

Therefore, the problem of the first data migration being undesirably time-consuming is compounded with the additional time required for the rollback migration and the subsequent retry migration. Together these delays make the prospect of performing a large data migration troublesome at best and, where a large enterprise is concerned, data migrations can be justifiably prohibitive.

SUMMARY

Introduced herein are methods and systems for rapidly rolling back and retrying a data migration from a first storage system to a second storage system. In one embodiment, upon receiving a request at a provisioning manager to perform a rollback of a first data migration from a first storage system to a second storage system, the first storage system merges, to a baseline dataset at the first storage system, a first incremental dataset received by the second storage system after the first data migration. Throughout the migration rollback the data of the baseline dataset and the incremental data are made available to a client and an application. In another embodiment, upon receiving a request at a provisioning manager to perform a retry of the data migration from the first storage system to the second storage system, the second storage system merges a second incremental dataset received to the first storage system with data previously received to the second storage system. Throughout the migration retry the data of the baseline dataset, first incremental dataset, and second incremental dataset are made available to the client such that non-disruptive data motion is maintained.

The solution presented here overcomes the time-consuming data migration problems of the prior art by removing the baseline dataset from the rollback and retry migration processes. After the initial migration of the baseline dataset from the source storage system to the destination storage system and after a rollback migration is requested, the provisioning manager determines whether the baseline dataset remains at the source storage system. If the baseline dataset remains at the source storage system the provisioning manager directs the source storage system to migrate, from the destination storage system, only modifications (incremental data) made to the baseline dataset. By skipping the large baseline dataset, the duration of the rollback migration is significantly decreased from that of the initial first data migration because the incremental dataset is typically a fraction of the size of the baseline dataset.

Similarly, during the retry migration, the provisioning manager utilizes existing data on the destination storage system, removing the necessity of copying duplicative data from the source storage system. The only data migrated during the retry migration is incremental data received to the source storage system after the performance of the rollback migration.

Utilizing data on a storage system that remains after a previous data migration resolves the problem of time-consuming rollback and retry migrations, because only incremental data is copied during the rollback and retry migration processes.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 1:
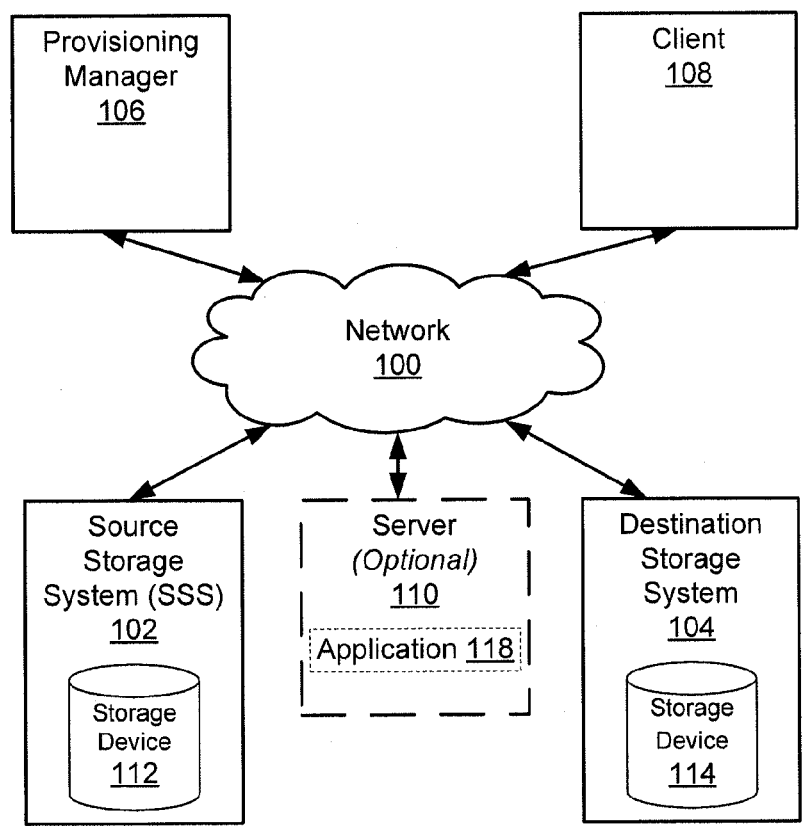
FIG. 1 illustrates a network storage environment in which the present invention can be implemented.

FIG. 1 shows a network configuration in which the techniques introduced here can be implemented. It is noted that the network environment described here is for illustration of one type of a configuration in which the techniques can be implemented, and that other network storage configurations and schemes can be used for implementing the techniques.

FIG. 1 shows a network data storage environment, which includes a client system 108, a source storage system (SSS) 102, a destination storage system (DSS) 104, a provisioning manager (PM) 106, an optional server (110), and computer network 100 connecting the client system 108, SSS 102, DSS 104, PM 106 and optional server 110.

The storage systems 102 and 104 each may be, for example, one of the FAS family of storage server products available from NetApp, Inc of Sunnyvale, Calif. The SSS 102 and DSS 104 connect to the client system 108, PM 106 and optional server 110 via the computer network 100, which can be, for example, a local area network (LAN), wide area network (WAN), or a global area network, such as the Internet, and can make use of any conventional or non-conventional network technologies. It is noted that, within the network data storage environment, any other suitable numbers of storage systems, clients, and/or mass storage devices may be employed.

In one embodiment, a server 110 is connected, via a network 100, to a client 108 and storage systems 102 and 104. The server 110 contains an application 118 running in memory and in communication with application data 422 and the client 108. The client interacts with the application 118, via the network 100, for services provided by the application 118. For example, the application 118 can be an email application, such as Microsoft Exchange®, that provides email services to the client 108. In this example, the application data generated or used by application 118 includes electronic mail-boxes that hold email messages updated via the application 118. In another embodiment, the application 118 is located on a storage device of storage system 102 or 104. It should be noted that the application 118 is not limited to an email application and may be essentially any computer application capable of receiving input from a client 108 and storing application data 422 on a storage system.

The storage systems 102 and 104 can make available, to the client 108 and application 118, some or all of the storage space of each respective storage system. For example, each of the non-volatile mass storage devices 112 and 114 can be implemented as one or more disks (e.g., a RAID group) or any other suitable mass storage device(s). Alternatively, some or all of the mass storage devices 112 and 114 can be other types of storage, such as flash memory, SSDs, tape storage, etc. The storage systems 102 and 104 can communicate with the client 108 and application 118 according to well-known protocols, such as the Network File System (NFS) protocol or the Common Internet File System (CIFS) protocol, to make data stored on the storage devices 112 and 114 available to client and/or application programs 118.

Various functions and configuration settings of the storage systems 102 and 104 can be controlled from a provisioning manager 106 coupled to the network 100. Among many other operations, a data migration operation can be initiated from the provisioning manager 106.

Figure 2:
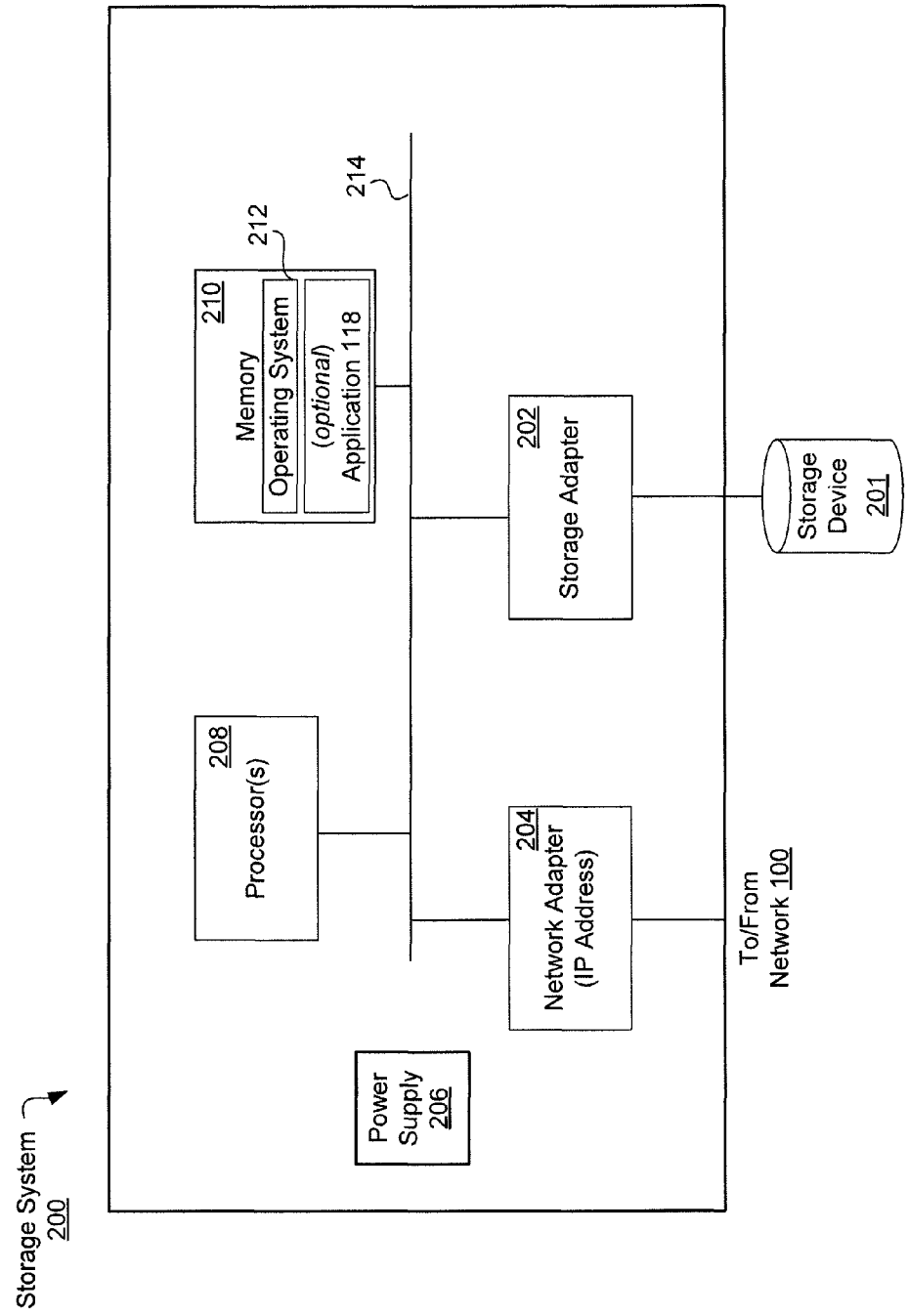
FIG. 2 is a high-level block diagram showing an example of the hardware architecture of a storage system that can implement the source storage server or the destination storage system.

FIG. 2 is a diagram illustrating an example of a physical storage system 200 that can implement one or more of the SSS 102 and DSS 104. In the illustrated embodiment, the storage system 200 is a server-class computer system that includes a processor subsystem that includes one or more processors 208. The storage system 200 further includes a memory 210, a network adapter 204, and a storage adapter 202, all interconnected by an interconnect 214.

The storage system 200 can be embodied as a single- or multi-processor storage system executing a storage operating system 212 that preferably implements a high-level module, such as a storage manager, to logically organize the information as a hierarchical structure of named directories, files and special types of files called virtual disks on the non-volatile mass storage device 201.

The memory 210 illustratively comprises storage locations that are addressable by the processors 208 and adapters 202 and 204 for storing software program code and data structures associated with the present invention. The processor 208 and adapters may, in turn, comprise processing elements and/or logic circuitry configured to execute the software code and manipulate the data structures. The storage operating system 212, portions of which are typically resident in memory and executed by the processor(s) 208, functionally organizes the storage system 200 by (among other things) configuring the processor(s) 208 to invoke storage related operations in support of the application 118, which may optionally reside on server 110, or in the memory 210 of the storage system 200. It will be apparent to those skilled in the art that other processing and memory implementations, including various computer readable storage media, may be used for storing and executing program instructions pertaining to the technique introduced here.

The network adapter 204 includes a plurality of ports to couple the storage system 200 to the client 108 over a network, such as a wide area network, virtual private network implemented over a public network (Internet) or a shared local area network. Additionally, the network adapter 204, or a separate additional adapter, is further configured to connect, via the network 100, the SSS 102 with the DSS 104. The network adapter 204 thus can include the mechanical, electrical and signaling circuitry needed to connect the storage system 200 to the network 100. Illustratively, the network 100 can be embodied as an Ethernet network or a Fibre Channel (FC) adapter, for example. Each client 204 can communicate with the application 118, via the network 100 by, exchanging discrete frames or packets of data according to pre-defined protocols, such as TCP/IP.

The storage adapter 202 cooperates with the storage operating system 212 to access information requested by the client 108 and application 118. The information may be stored on any type of attached array of writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on non-volatile mass storage device 201.

The storage operating system 212 facilitates the client's and the application's access to data stored on the non-volatile mass storage device 201. In certain embodiments, the storage operating system 212 implements a write-anywhere file system that cooperates with one or more virtualization modules to "virtualize" the storage space provided by the non-volatile mass storage device 201. In the illustrative embodiment, the storage operating system 212 is a version of the Data ONTAP® operating system available from NetApp, Inc. implementing the Write Anywhere File Layout (WAFL®) file system. However, other storage operating systems are capable of being enhanced or created for use in accordance with the principles described herein.

Figure 3:
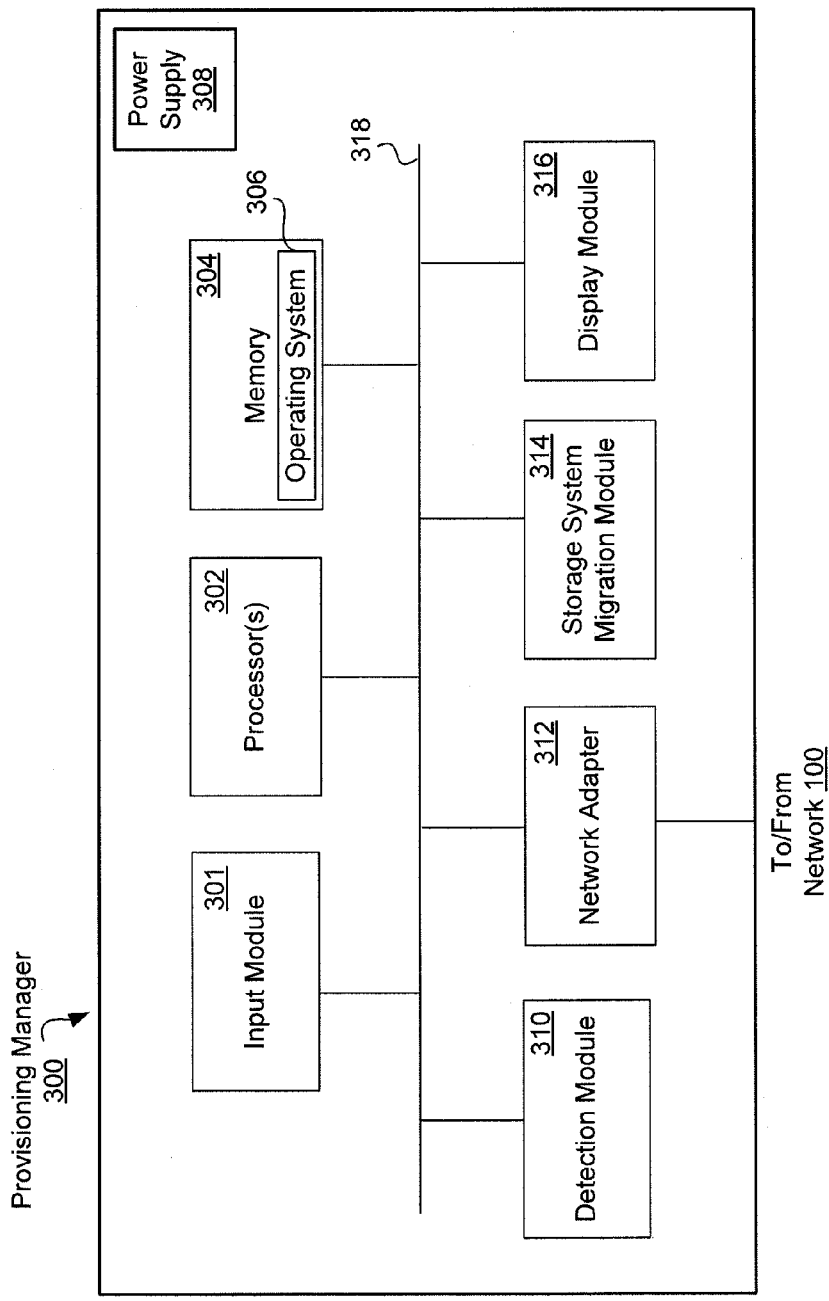
FIG. 3 is a high-level block diagram showing an example of the hardware architecture of a provisioning manager.

FIG. 3 is a diagram illustrating the internal architecture 300 of the provisioning manager (PM) 106. In an exemplary embodiment, the PM includes software in memory of a server 110 that is executed by a processor in accordance with the present invention. In an alternative embodiment, PM includes a processor subsystem that includes one or more processors 302. The PM 300 further includes an input module 301, memory 304, a detection module 310, a network adapter 312, a storage system migration module (SSMM) 314, and a display module 316 all interconnected by an interconnect 318 and powered by a power supply 308.

The provisioning manager 300 can be embodied as a single- or multi-processor storage system executing an operating system 306 stored in the memory 304. The processor 302 and adapters may, in turn, comprise processing elements and/or logic circuitry configured to execute the software code and manipulate the data structures. The operating system 306, portions of which are typically resident in memory and executed by the processor(s) 302, functionally organizes the provisioning manager by (among other things) configuring the processor(s) 302 to invoke storage operations to migrate data between non-volatile mass storage devices 112 and 114 (FIG. 1). It will be apparent to those skilled in the art that other processing and memory implementations, including various computer readable storage media, may be used for storing and executing program instructions pertaining to the technique introduced here.

The network adapter 312 includes a plurality of ports to couple the PM to the storage systems 102 and 104 over a wide area networks, virtual private network implemented over a public network (Internet) or a shared local area network. The network adapter 312 thus can include the mechanical, electrical and signaling circuitry needed to connect the PM 300 to the network 100.

The input module 301 is configured to receive data from a user selection and communicate the received data to the processor 302 and operating system 306, via the interconnect 318. The input module 301 can receive data from, for example, a keyboard, mouse, trackball, touch screen, or any other input device capable of communicating a user selection.

The display module 316 is configured to connect to an output device that illustrates a plurality of storage migration options to a user. The output device can be a computer screen, monitor, or projection capable of displaying text and graphical representations of data. In one embodiment, the display module 316 outputs storage migration options relating to performing a data migration from the SSS 102 to the DSS 104, rolling back the data migration from the DSS to the SSS, and retrying the data migration from the SSS to the DSS.

The detection module 310 is configured to connect, via the network adapter, to a storage system 200 and determine whether a dataset located on the non-volatile mass storage device 201 was copied to another storage system as part of a previously performed data migration. For example, in one embodiment, the detection module 310 can determine whether a baseline dataset 406 (FIG. 4) is present at the non-volatile mass storage device 112 of SSS 102 is present and whether the baseline dataset was copied to storage device 114 of DSS 104 as part of a previous data migration 422 from the SSS to the DSS.

The detection module 310 can further be configured to determine a storage capacity of a storage system 200 and calculate whether the storage system has adequate capacity to receive data, as part of a data migration, from another storage system. For example, Data Fabric Manager (DFM), from NetApp, Inc of Sunnyvale, Calif., monitors and records the storage capacity of devices connected to a network, such as the SSS and DSS, and stores the results on the devices. The PM can determine, based on the stored results, the available storage capacity at the SSS and DSS.

Similarly, using the results provided by the DFM, the detection module 310 can additionally be configured to resize the storage volume of a storage device 201 to a desirable size to support an impending data migration.

The storage adapter 202 cooperates with the storage operating system 212 to access information requested by the client 108 or application 118. The information may be stored on any type of attached writable storage media, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 201.

Figure 4:
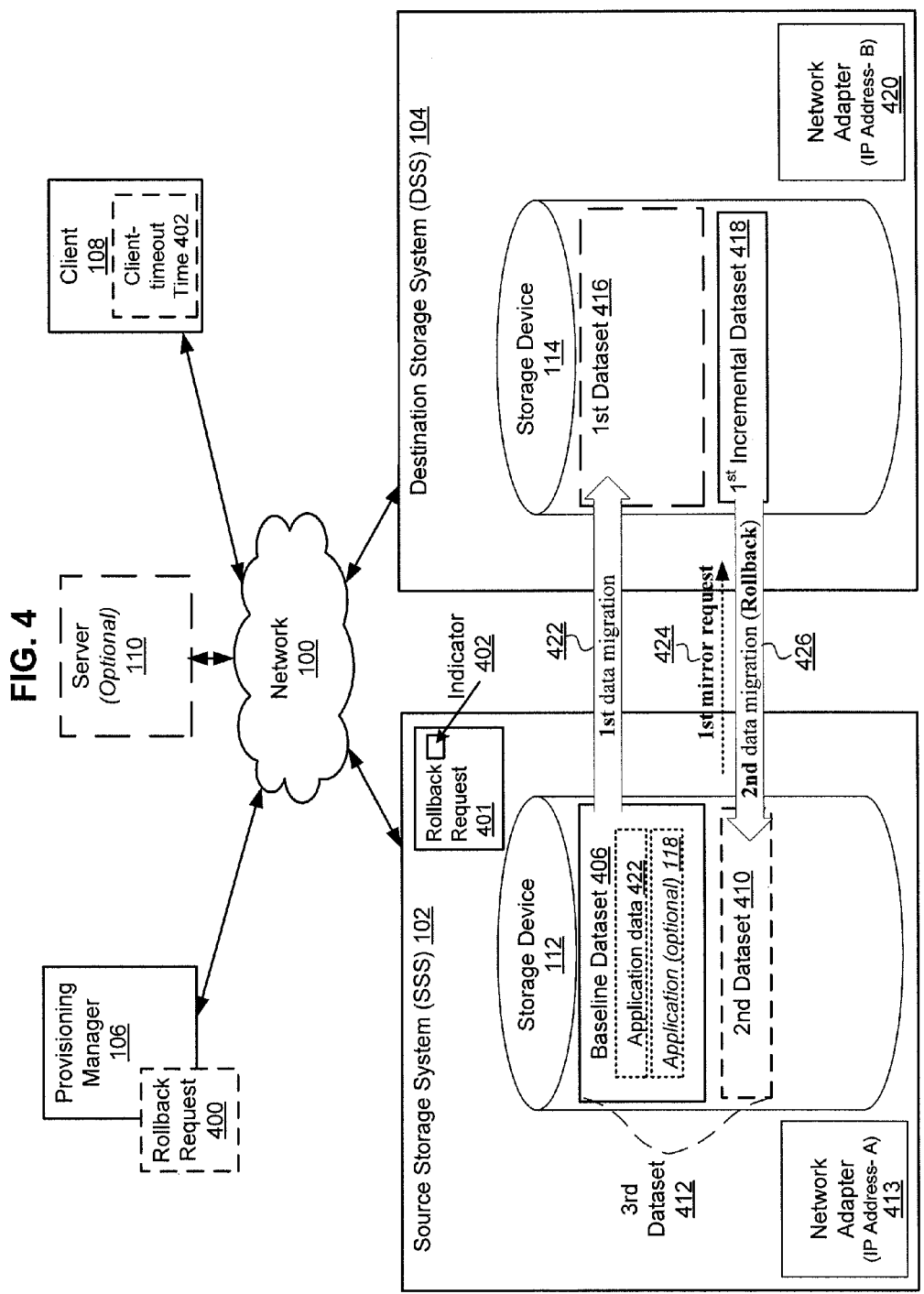
FIG. 4 illustrates an example of the network storage environment performing a rapid rollback of a first data migration.
Figure 5:
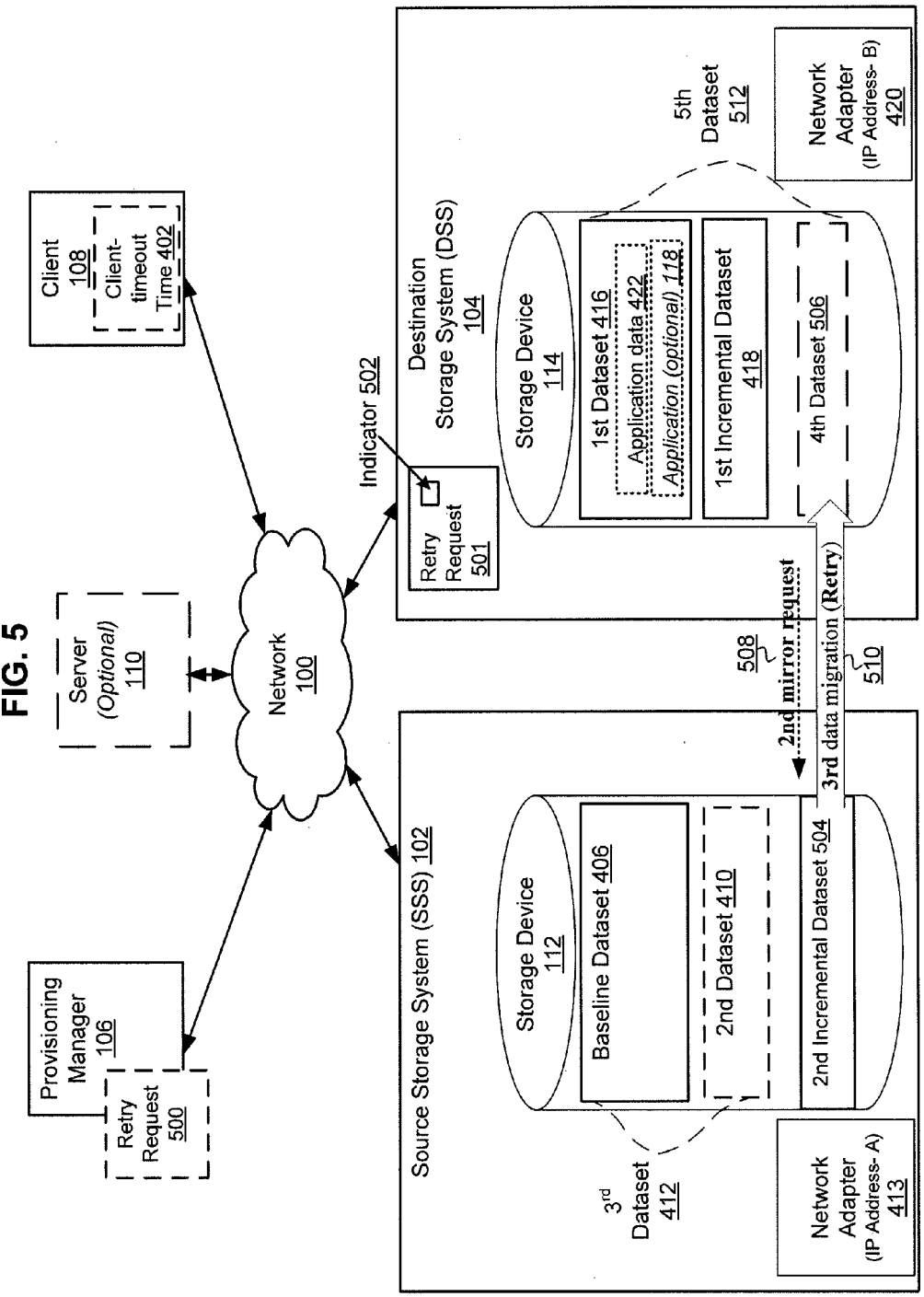
FIG. 5 illustrates an example of the network storage environment performing a rapid retry after the performance of the rapid rollback.

The storage system migration module (SSMM) 314 is configured to initiate data migrations between the SSS 102 and the DSS 104. In one embodiment, the SSMM is configured to initiate a first data migration between the SSS and the DSS. The SSMM further can be configured to initiate a rollback migration, as illustrated in FIG. 4, of the first data migration. The SSMM further can be configured to initiate a retry of the first data migration from the SSS to the DSS, as illustrated in FIG. 5. The SSMM further can be configured to perform a cutover, as further explained herein, from one storage system, such as the SSS 102, to another storage system, such as the DSS 104. Alternatively, the SSMM 314 can be configured to perform one or more of the above steps.

In one embodiment, the SSMM 314 can be a processor 302, programmed by the operating system 306 or other software stored in memory 304, to perform the cutover, first migration, rollback migration and retry migration. Alternatively, the SSMM 314 can be special-purpose hardwired circuitry.

FIG. 4 illustrates a rollback of a previously performed first data migration 422. During the first data migration 422, a baseline dataset 406 is copied from the SSS 102 to the DSS 104. The baseline dataset includes application data 422 accessible to the client 108 and application 118. In one embodiment, the application 118 is part of the baseline dataset. After the performance of the first data migration, a user or administrator may determine that, due to an unforeseen problem with the first data migration, a migration rollback is desirable.

For instance, the unforeseen problem may be degraded access times, from the client 108 or application 118 to the first dataset 416, related to network/system performance lag. Or, after the first data migration 422, an administrator may determine that there is inadequate data capacity, at the DSS 104, for the projected growth rate of application data 422. Similarly, other issues may become manifest only several days after the first data migration and after new data is added, removed or changed at the first dataset 416. Therefore, a complete rollback from the DSS to the SSS will include the previously migrated data 416 and any incremental data 418. Incremental data 418 is new data added to an existing dataset, such as the baseline dataset. Incremental data is typically much smaller in size than the baseline data. Data is classified as incremental data through a variety of methods well-known to those in the art familiar with data backup procedures. In one embodiment, data is characterized as incremental data based on a data snapshot of the DSS and/or SSS, such as that provided by the Snapshot™ technology available at NetApp, Inc of Sunnyvale, Calif. For example, a snapshot of the DSS stores a point-in-time reference to the data currently at the DSS. New data arriving to the DSS will be received after the snapshot and will be characterized as incremental data. An example of incremental data is an email received to the DSS after the first data migration. Any number of additional modifications can be made to the application data 422 by the client 108 or the application 118.

In one embodiment, a rapid rollback of data from the DSS 104 to the SSS 102 is performed by utilizing the baseline dataset 406 at the SSS 102, thus avoiding the necessity of copying the first dataset 416 from the DSS 104. On determination that a rollback is desired, an administrator requests 400, at an input module 301 of the PM, a rollback migration from the DSS to the SSS. Next, the SSMM 314 (FIG. 3) operates with the detection module 310 to determine if the baseline dataset 406 is available at the SSS 102, for example, by using the Snapshot technology previously disclosed. If the baseline dataset 406 is available, the SSMM 314 sends to the SSS a rollback request 401; otherwise, a full migration of the baseline dataset 406 can be performed by the SSMM 314. The rollback request 401 is a request instructing the SSS to perform a rollback migration from the DSS.

In one embodiment, the rollback request 401 further contains an indicator 402 to avoid coping to the SSS the first dataset 416 of the first data migration because this data is available at the SSS as the baseline dataset. Alternatively in another embodiment, the indicator 402 specifically directs the SSS to copy only the incremental data 418 received after the first data migration.

Upon receipt of the rollback request 401, the SSS 102 sends to the DSS 104, a first mirror request 424 to copy, from the DSS, the incremental dataset 418 received after the performance of the first data migration 422 of the baseline dataset. The incremental dataset 418 is data received from the client 108 or application 118 that modifies the first dataset 416 at the DSS 104. Upon receipt of the first mirror request 424 by the DSS, the DSS sends to the SSS the requested incremental dataset 418 which is merged into a third dataset 412, at the SSS 102, by updating the baseline dataset 406 with the incremental dataset 418.

In one embodiment, after completion of the rollback migration 426, a cutover is performed. A cutover is a process of reconfiguring the Network 100, SSS 102, and DSS 104 such that a client 108 can access resources of one of the storage systems after one other of the storage systems is brought offline ("decommissioned"). During the cutover, the DSS is decommissioned from the network 100 and the SSS is brought online ("commissioned"). When a storage system 200, such as the DSS, is decommissioned, the application data 422 is no longer available to the client 108 or application 118, and similarly, when the SSS is brought online, the client and application can access the application data 422 from the SSS. The cutover is performed without reconfiguring the application 118 or the client 108 from accessing the application data 422 from the DSS. In one embodiment, as part and near the completion of the cutover, the Network Adapter IP Address 413, at the SSS, is configured to be identical to the Network Adapter IP Address 420, at the DSS, thus allowing a client to continue to access the application data 422 during the cutover, without reconfiguring the client.

In one embodiment, the cutover process does not exceed a maximum duration time equal to a client-timeout time 402. The client-timeout time is the maximum amount of time that a client 108 can wait for requested data without receiving a network timeout error. In one embodiment, the client-timeout time is less than a protocol-timeout time of a protocol used to communicate between the application 118 and a storage system 200, such as the SSS and the DSS. For example, in one embodiment, the protocol-timeout time, and thus the client-timeout time, is equal to or less 120 seconds which is a default timeout time utilized by various network protocols such as NFS, and iSCSI.

FIG. 5 illustrates a rapid retry of the first data migration 422. After the resolution of the problem necessitating the rapid rollback 426 of the first data migration, the user or administrator may request a retry 500 of the data migration.

In one embodiment, a rapid retry is performed by utilizing, at the DSS, the first dataset 416 and the first incremental dataset 418 as part of the data of the retry migration 510. In prior art, a retry migration essentially repeated the steps of the initial first data migration 422 and required that the entire baseline dataset 406 be copied from the DSS 104 to the SSS 102. Utilizing the existing datasets 416 and 418 avoids the necessity of copying the baseline dataset 406 and the second dataset 410 from the SSS. This allows for rapid performance of the retry data migration 510. If the first dataset 416 and the first incremental dataset 418 are physically present on the DSS, the SSMM 314 sends to the DSS a retry request 501 instructing the DSS to perform a retry migration from the SSS to the DSS.

In one embodiment, the retry request 501 further contains an indicator 502 to avoid copying, to the DSS, the baseline dataset 406 and the second dataset 410. Alternatively in another embodiment, the indicator 502 specifically directs the DSS to copy only the second incremental dataset 504 received to the SSS after the rollback migration 426. The second incremental dataset 504 is data received from the client 108 or application 118 that modifies the baseline dataset 406 and second dataset 410 at the SSS 102. For example, the second incremental dataset 504 can be a client 108 modification to the application data 422, at the SSS 102, such as a graph added to a document or a new calculation added to a spreadsheet.

Upon receipt of the retry request 501, the DSS sends to the SSS, a second mirror request 508 to copy the second incremental dataset 504. The SSS responds to the second mirror request 508 by sending to the DSS the second incremental dataset, which is merged at the DSS into a fifth dataset 512 by updating, based on the aforementioned Snapshot technology, the first dataset 416 and first incremental dataset 418 with the second incremental dataset 504.

In one embodiment, after completion of the retry migration 510, a cutover is performed as previously described. During the cutover, the SSS is brought offline from the network 100 and the DSS is brought online. In one embodiment, as part of the cutover, the Network Adapter IP Address 420, at the DSS, is configured to be identical to the Network Adapter IP Address 413, at the SSS.

In one embodiment, throughout the first data migration 422, the second data migration (rollback) 426, and the third data migration (retry) 510, the application data 422 is available to the client 108 and application 118, except during the client-timeout time 402. In particular, prior to the first data migration 422, the application data 422 of the baseline dataset 406 is accessible, via the network 100, by the application 118 and the client 108. Throughout the first data migration, the original baseline dataset 406 containing the application data 422 remains accessible to the client 108 while a copy of the baseline dataset is migrated to the DSS. After the baseline dataset is copied to the DSS as the first dataset 416, client 108 and application 118 access to the application data 422 is transitioned, as part of the cutover, from the SSS 102 to the DSS 104.

Figure 6:
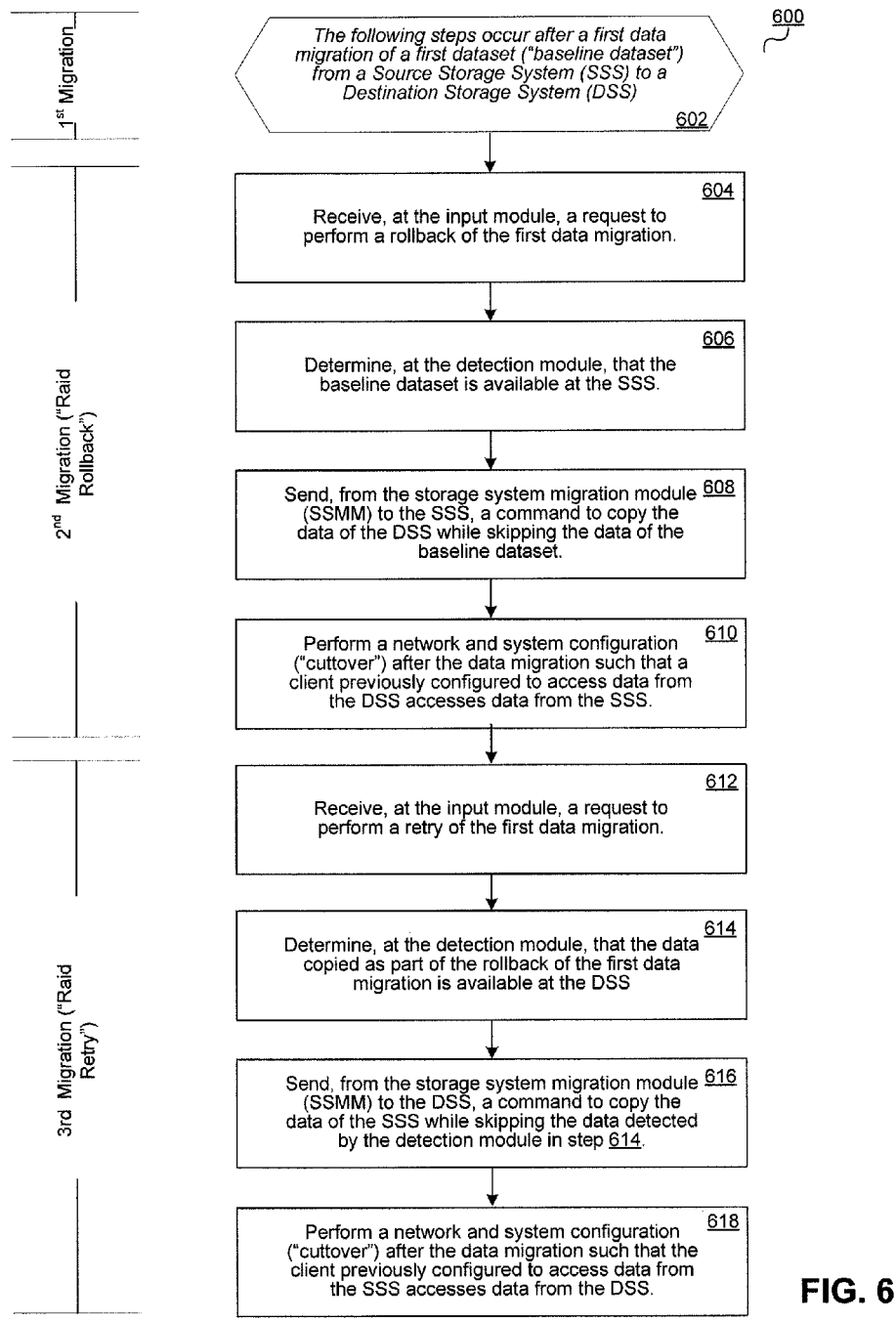
FIG. 6 is a flow diagram illustrating a process for a provisioning manager performing a first data migration, a rollback of the first data migration, and a retry of the first data migration.

FIG. 6 is a flow diagram depicting a process for performing, at the PM 106, a rapid rollback and rapid retry of a migration between the DSS and the SSS. After a first data migration has occurred, as illustrated in step 602, the PM receives at 604 a request to rollback the previously performed first data migration. The request can come from, for example, a user or administrator, via an input device, to the input module 301. The user or administrator can enter the request using any input device capable of communicating with the input module, such as a touch screen, keyboard, or mouse, for example. After the rollback request 400 (FIG. 4) is received, the PM determines at 606 whether the data of the first data migration (the baseline data) is located on the SSS 102. For example, if, during the first data migration, the baseline dataset was copied from the SSS to the DSS, the PM would determine, using the detection module 310, whether the baseline dataset is still present at the SSS 102. If it is determined that the baseline dataset is not present at the SSS, the rollback migration 426 may copy both the first dataset 416 and the first incremental dataset 418 from the DSS 104 to the SSS 102. If the PM determines that the baseline dataset remains on the SSS, the PM sends (step 608) to the SSS a rollback request instructing the SSS to copy the data of the DSS while skipping data previously copied during the first data migration. Following the above example, the SSS would then receive a request from the PM to copy only incremental data received to the DSS after the first data migration of the baseline data. After the incremental data is copied from the DSS to the SSS, the PM performs a cutover (step 610) such that client and application access to application data 422 is routed to the SSS.

Step 612 is the first step of the process to rapidly retry the first data migration from the SSS to the DSS. In step 612, the user or administer requests a retry migration at the PM. Upon receipt of the retry request, the detection module 310 determines whether the DSS retains data related to the first data migration and the rollback migration. Particularly, in step 614, the PM detects that the first dataset and the first incremental dataset are available at the DSS. In step 616, the PM sends to the DSS a request to copy, from the SSS to the DSS, incremental data received after the performance of the rollback migration. An indicator 502 in the retry request 501 informs the DSS to avoid duplicating the data of the baseline dataset 406 (FIG. 4) and the second dataset 410. After the incremental data is copied from the SSS to the DSS, the PM performs a cutover (step 618) such that client and application access to application data 422 is routed to the DSS.

Figure 7:
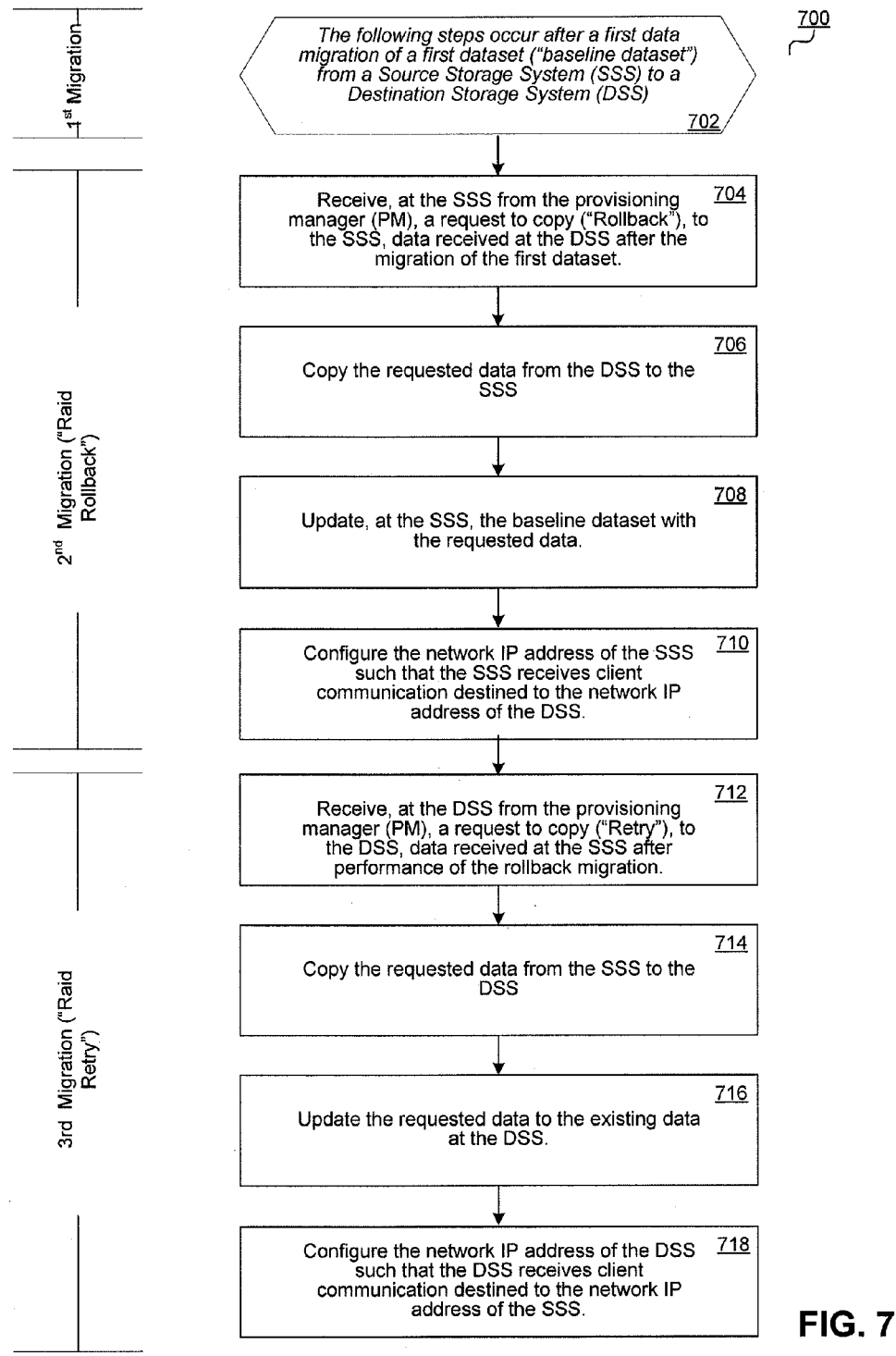
FIG. 7 is a flow diagram illustrating a process for the source and destination storage systems performing a first data migration, a rollback of the first data migration, and a retry of the first data migration.

FIG. 7 is a flow diagram depicting a process for performing, at the SSS and the DSS, a rapid rollback and rapid retry of a first data migration. After a first migration has occurred from the SSS to the DSS, as illustrated in step 702, the SSS receives, from the PM, a request to rollback from the previously performed first data migration (step 704). The rollback request includes details of a new migration to perform from the DSS to the SSS. Particularly, the rollback request includes an indicator informing the SSS to skip data (e.g. the baseline dataset) previously copied from the SSS to the DSS. In step 706, the SSS copies the requested data from the DSS that is merged, in step 708, to the baseline dataset. After the data is copied and merged at the SSS, and as part of a cutover process initiated by the PM, the SSS and DSS are configured, in step 710, such that the application and client access the application data 422 on the SSS, not the DSS. For example, by taking the DSS offline form the Network 100 and configuring the network IP Address of the SSS to be identical to the network IP address of the DSS, the application 118 and client 108 can access application data 422 on the SSS without being reconfigured. In other words, an application 118 configured to access application data 422 on the DSS can access the application data on the SSS, after the cutover, without any changes being made to the application.

Once it is determined that a retry of the data migration is desirable, for example, after resolving an issue requiring the rollback migration, the DSS receives a request 501, from the PM, to retry the data migration (step 712). The rollback request includes an indicator 502 informing the DSS to skip data (e.g. the first dataset and first incremental dataset) previously copied during the first data migration and second data migration. In step 714, the requested data (the second incremental dataset) is copied from the SSS to the DSS where it is merged, in step 716, with the existing data at the DSS (the first dataset and the first incremental dataset). Finally, in step 718 and as described in step 618, client and application access to the application data 422 is cutover from the SSS to the DSS.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising,
    sending, from a source storage system (SSS) to a destination storage system (DSS) via a network, a first dataset as part of a data migration from the SSS to the DSS, wherein the first dataset includes a copy of a baseline dataset stored at the SSS, and wherein, throughout the data migration, the baseline data is made available to a client via the network;
    cutting over from the SSS to the DSS such that an application is available, after a cutover duration, to communicate the first dataset to the client via the network, wherein cutting over makes the first dataset available to the application without reconfiguring the application from accessing the baseline dataset at the SSS, and wherein the cutover duration is less than a client-timeout time that the client can wait for a requested application data without the client receiving a timeout error;
    receiving, at the SSS from a provisioning manager (PM), a request to rollback the data migration by migrating a second dataset from the DSS to the SSS, wherein the DSS contains the first dataset and the second dataset, and wherein the second dataset is an incremental dataset received at the DSS after the data migration;
    receiving at the SSS, in response to the request, the second dataset from the DSS; and
    merging into a third dataset, at the SSS, the baseline dataset with the second dataset.

2. The method of claim 1, further comprising, after the merging of the baseline dataset with the second dataset, cutting over from the DSS to the SSS such that an application is available, after a cutover duration, to communicate the third dataset to the client via the network, wherein cutting over makes the third dataset available to the application without reconfiguring the application from accessing the first and second dataset at the DSS, and wherein the cutover duration is less than a client-timeout time that the client can wait for a requested application data without the client receiving a timeout error.

3. The method of claim 2, wherein the client-timeout time is less than a protocol-timeout time of a protocol used to communicate between the application and a storage system.

4. The method of claim 2, wherein the protocol-timeout time is greater than 180 seconds.

5. The method of claim 1, wherein an application makes the baseline dataset available to the client.

6. The method of claim 1, wherein the baseline dataset includes a copy of an application, and wherein the application makes the baseline dataset available to the client.

7. The method of claim 1, wherein, after the data migration and after receiving the request, at the PM, to perform the rollback of the data migration, the PM detects that the baseline dataset is available to the SSS.

8. The method of claim 1, wherein the baseline dataset, at the SSS, is brought online by the PM.

9. The method of claim 1, wherein the request includes an indicator to exclude mirroring the first dataset as part of the second migration.

10. The method of claim 1, wherein the retrieving of the second dataset is preceded by sending, from the SSS to the DSS, a first mirror request to mirror the second dataset to the SSS.

11. The method of claim 1, wherein throughout the first data migration, an application is operating in the SSS and available to communicate, via the network, the baseline dataset to the client.

12. The method of claim 1, wherein throughout the data migration, an application is operating at a server and available to communicate, via the network, the baseline dataset to the client, and wherein the server is other than the SSS or DSS.

13. The method of claim 1, further comprising, after the migration of the second dataset,
    detecting, at the DSS by the PM, the first dataset and the second dataset,
    receiving, at the DSS from the PM, a request to perform a retry of the data migration from the SSS to the DSS, and
    performing the requested retry of the data migration from the SSS to the DSS.

14. The method of claim 13, further comprising, after the performance of the requested retry of the data migration, cutting over from the SSS to the DSS such that an application is available to communicate, after a cutover duration, a fifth dataset to the client via the network, wherein cutting over makes the fifth dataset available to the application without reconfiguring the application from accessing the third dataset at the SSS, and wherein the cutover duration is less than a client-timeout time that the client can wait for a requested application data without the client receiving a timeout error, and wherein the fifth dataset includes the first dataset and the first incremental dataset.

15. The method of claim 14, further comprising, before cutting over from the SSS to the DSS, retrieving to the DSS, based on the request to perform the retry of the data migration request and as an additional member of the fifth dataset, a fourth dataset, wherein the fourth dataset includes a second incremental dataset received to the SSS after the second data migration.

16. The method of claim 15, wherein the retrieving of the fourth dataset is preceded by sending, from the DSS to the SSS, a second mirror request to mirror the fourth dataset to the DSS.

17. The method of claim 15, further comprising, merging, at the DSS, the fifth dataset with the fourth dataset.

18. The method of claim 13, further comprising, before detecting the first dataset and the second dataset at the DSS, the PM receives a request to perform a retry of the data migration.

19. The method of claim 13, wherein the request to perform the retry of the data migration includes an indicator to exclude mirroring the baseline dataset as part of the third migration.

20. The method of claim 13, wherein throughout the performance of the third data migration, the application is available to communicate to the client, via the network, the third dataset and any incremental data received to the SSS after the second data migration.

21. The method of claim 1, wherein the PM is located on at least one of the SSS, DSS, or a server connected to the network.

22. A method comprising:
operating a source storage system (SSS) and a destination storage system (DSS); and
performing a data migration rollback from the DSS to SSS and a data migration retry from the SSS to the DSS by utilizing, after a prior attempted migration, a dataset remaining at each of the SSS and the DSS, wherein at least one cutover is performed during the performance of the migration rollback and migration retry and a duration of the cutover is less than a client-timeout time that the client can wait for a requested application data without the client receiving a timeout error.

23. The method of claim 22, further including, detecting, by a provisioning manager (PM), a first dataset of the plurality of datasets at the SSS and a second dataset at the DSS, each said dataset remaining at the respective SSS and DSS after an attempted migration from the SSS to the DSS.

24. The method of claim 23, wherein, throughout performance of the migration rollback and migration retry, the PM sends a request to one of the DSS and the SSS to mirror the data of the other one of the DSS and the SSS, wherein the request includes an indicator to exclude mirroring any dataset of the plurality of datasets remaining after the prior attempted migration.

25. The method of claim 23, wherein throughout the duration of the performance of the migration rollback and migration retry, an application is available to communicate the plurality of datasets located at either the SSS or the DSS via a network to a client, except during the cutover duration, wherein during the cutover the PM makes available the plurality of datasets located on one of the SSS or the DSS while making unavailable the plurality of datasets on the other one of the SSS or the DSS.

26. The method of claim 22, wherein the client-timeout time is less than 120 seconds.

27. A provisioning manager (PM) comprising,
an input module for receiving a user selection of a migration option of a plurality of migration options;
a detection module configured to detect a migration-data of a first storage system, wherein the migration-data includes a post-migration dataset sent by the first storage system after a prior attempted migration from the first storage system to a second storage system, wherein both the first storage system and the second storage system are each individually coupled to a network, wherein the detection module is further configured to determine, before the initiation of the rollback migration, if the first storage system has the capacity to store the migration data rolled back from the second storage system; and
a storage system migration module (SSMM) configured to initiate, after the detection of the post-migration dataset at the first storage system and based on a user selected rollback migration option of the plurality of migration options, a rollback of migration data from the second storage system to the first storage system by sending a migration-rollback request to the first storage system, wherein the migration-rollback request includes an indicator to exclude the post-migration dataset during the rollback of migration data from the second storage system.

28. The PM of claim 27, wherein the detection module is further configured to determine, before the initiation of the rollback migration, if the storage volume of the first storage system has been resized since the prior attempted migration, wherein when the first storage volume has been resized and provided that the second storage volume has the capacity, the second storage volume is accordingly resized to the size of the first storage volume.

29. The PM of claim 27, wherein the SSMM is further configured to perform a cutover from the second storage system to the first storage system by decommissioning the second storage system from serving data, via the network, to an application and commissioning the first storage system to serve the data, via the network, to the application, wherein the cutover is performed without reconfiguring the application from accessing the data from the second storage system.

30. A method comprising,
sending, from a source storage system (SSS) to a destination storage system (DSS) via a network, a first dataset as part of a first data migration from the SSS to the DSS, wherein the first dataset includes a copy of a baseline dataset stored at the SSS, and wherein, throughout the first data migration, the baseline data is made available, at the SSS, to a client via the network;
updating, at the SSS, the baseline dataset with an incremental dataset received from the DSS as part of a rollback of the first data migration, wherein the initiation of the rollback of the first data migration is based on a rollback request received at a provisioning manager (PM), and wherein, throughout the rollback of the first data migration, the incremental dataset is made available, at the DSS, to the client, wherein a cutover duration does not exceed a client-timeout time that the client can wait for a requested application data without the client receiving a timeout error.

* * * * *